(12) United States Patent  (10) Patent No.: US 7,753,979 B2
Amann  (45) Date of Patent: Jul. 13, 2010

(54) FILTER ASSEMBLY WITH ADJUSTABLE INLET OPENING

(75) Inventor: Michael Andrew Amann, St. Louis, MO (US)

(73) Assignee: Home Health Medical Equipment, Inc., St. Louis, MO (US)

( * ) Notice: Subject to any disclaimer, the term of this patent is extended or adjusted under 35 U.S.C. 154(b) by 1143 days.

(21) Appl. No.: 11/307,526

(22) Filed: Feb. 10, 2006

(65) Prior Publication Data

US 2007/0186520 A1  Aug. 16, 2007

(51) Int. Cl.
B01D 35/14 (2006.01)
A61L 2/20 (2006.01)

(52) U.S. Cl. .................. 55/413; 55/385.3; 55/385.4; 55/418; 55/420; 55/486; 55/497; 55/DIG. 34; 96/380; 96/381; 96/383; 96/384; 96/385; 96/386; 96/388; 96/416; 96/417; 96/418; 96/422; 181/231; 181/256; 181/229; 181/252; 116/268; 116/271; 116/DIG. 25; 73/31.04; 422/22; 422/28; 422/297; 422/300; 422/310; 422/366; 206/438; 220/315; 220/371; 220/372; 220/367.1

(58) Field of Classification Search ................ 55/385.3, 55/413, 486, 497, DIG. 34, 418, 420, 385.4; 96/380, 381, 383–386, 388, 416, 417, 418, 96/422; 181/231, 256, 229, 252; 116/268, 116/271, DIG. 25; 73/31.04; 422/22, 28, 422/297, 300, 310, 366; 206/438; 220/315, 220/371, 372, 367.1

See application file for complete search history.

(56) References Cited

U.S. PATENT DOCUMENTS

| 3,380,553 | A | * | 4/1968 | Gibel | 181/230 |
| 4,302,224 | A | * | 11/1981 | McCombs et al. | 96/109 |
| 4,480,558 | A |  | 11/1984 | Russell | |
| 4,789,388 | A | * | 12/1988 | Nishibata et al. | 96/7 |
| 5,161,100 | A | * | 11/1992 | Whipple | 700/40 |
| 5,167,577 | A | * | 12/1992 | Kristensson | 454/298 |
| 5,188,646 | A |  | 2/1993 | Nolen, Jr. | |
| RE35,236 | E |  | 5/1996 | Nolen, Jr. | |
| 5,626,569 | A | * | 5/1997 | Holtermann et al. | 604/333 |
| 5,772,713 | A |  | 6/1998 | Salinas et al. | |
| 6,077,336 | A | * | 6/2000 | Ulrich et al. | 96/222 |
| 6,190,442 | B1 | * | 2/2001 | Redner | 96/421 |
| 6,743,281 | B1 | * | 6/2004 | Miller | 96/416 |
| 7,001,441 | B2 | * | 2/2006 | Bauer | 55/385.4 |
| 7,141,101 | B2 | * | 11/2006 | Amann | 96/380 |
| 7,481,926 | B2 | * | 1/2009 | Dworatzek | 210/232 |
| 2001/0035096 | A1 | * | 11/2001 | Stuart | 96/380 |
| 2003/0213368 | A1 |  | 11/2003 | Roberts et al. | |
| 2005/0279212 | A1 |  | 12/2005 | Amann | |
| 2008/0087169 | A1 | * | 4/2008 | Clark | 96/385 |
| 2009/0025564 | A1 | * | 1/2009 | Kuwabara | 96/388 |

* cited by examiner

Primary Examiner—Robert A Hopkins
Assistant Examiner—Minh-Chau T Pham
(74) Attorney, Agent, or Firm—Husch Blackwell Sanders, LLP

(57) ABSTRACT

A filter assembly for use with compressor assemblies such as oxygen concentrators, ventilators and other breathing apparatus including a compartmented housing member having at least one inlet opening, an outlet opening, a filter member, and an adjustment member associated with the at least one outlet opening for varying the size of the at least one outlet opening for adjusting the amount of ambient air entering the filter assembly.

39 Claims, 3 Drawing Sheets

FILTER ASSEMBLY WITH ADJUSTABLE INLET OPENING

BACKGROUND OF INVENTION

This invention relates generally to filter assemblies and, more particularly, to several embodiments of a universal type filter assembly which is adaptable for use in compressor assemblies associated with oxygen concentrators, ventilators, and other medical applications in the home care medical equipment industry, which filter assemblies include means for adjustably controlling the air flow requirements into the unit based upon the particular needs of the compressor assembly to which it is attached. The present filter assemblies also include baffle means configured for noise attenuation.

Oxygen concentrators, ventilators, and other medical applications which utilize compressor assemblies are commonly used in the care of respiratory patients, particularly, in the home care environment, to provide sufficiently high purities of oxygen to the patient without using high pressure tanks of liquid oxygen. Oxygen concentrators and the like utilize ambient atmospheric air as their source of oxygen in conjunction with an absorption system to separate oxygen from the other gases found in the air and to provide that oxygen in concentrated form to the patient. Atmospheric air typically includes approximately 80% nitrogen and 20% oxygen. Nitrogen is typically absorbed by the absorption system and is retained therein until subsequently purged.

Typically, atmospheric air is drawn into an oxygen concentrator, ventilator, or other breathing apparatus from the ambient environment and such ambient air is then passed through a filter assembly to remove dust and other contaminants from the ambient atmospheric air. The filtered air is then pressurized by a compressor and, in the case of an oxygen concentrator, is then introduced into the absorption system. Once the compressed air is introduced into the absorption system, the nitrogen is selectively absorbed and released to atmosphere leaving the residual oxygen available for patient use. Oxygen concentrators typically produce an oxygen concentration usually in the range of 90-95%.

Use of an effective filtration system for purging contaminants from any liquid or gas is always important for a multitude of obvious reasons. Properly and effectively filtering the incoming ambient air before it is compressed and introduced into the absorption system of an oxygen concentrator, or before it is provided directly to the patient, is always important because effective filtration not only improves the overall efficiency of the oxygen concentrator, ventilator or other breathing apparatus but it also improves and increases the oxygen concentration provided to the patient. Poor filtration of the incoming air also subjects the oxygen concentrator, ventilator, or other similar apparatus and its associated compressor to excessive wear from particles which contaminate the system thereby decreasing service life while increasing maintenance.

As a result, a wide variety of different types of filter assemblies are utilized in conjunction with a wide variety of different types of compressors associated with all types of breathing apparatus such as oxygen concentrators, ventilators, and other similar equipment. These filters are specifically designed to both mate with the particular oxygen concentrator or other breathing apparatus and to provide at least the minimum required air flow to the compressor for proper operation of the breathing apparatus. This means that a properly designed filter assembly must be mated with a particular oxygen concentrator or other breathing apparatus based upon the air flow requirements of the oxygen concentrator or other breathing apparatus.

Still further, the type and size of compressor associated with the oxygen concentrator or other breathing apparatus likewise determines the overall oxygen flow rate capacity as well as the level of noise produced by the system during operation. In general, large compressors required for providing higher rates of oxygen require a filter assembly designed to provide the necessary air flow through the filter and to the compressor for proper operation. Also, large compressors required for providing higher rates of oxygen can be quite noisy. As a result, acoustic dampening and other noise attenuation means are sometimes provided in an effort to insulate and dampen the noise from the compressor. Since oxygen concentrators, ventilators and other similar breathing apparatus are typically used at home, or in a hospital or nursing home type environment, noise generation can be a problem. Often times, despite the efforts made to dampen the noise associated with various compressors, the sound generated is still often excessive. Noise attenuation is therefore likewise always an issue in designing effective filtration systems for use in the home care medical equipment environment.

It is therefore desirable to provide a universal type filter assembly which not only improves the air filtration process to the absorption system of an oxygen concentrator or other compressor assembly, but which likewise includes means for adjustably controlling the air flow requirements to the compressor assembly such that the same filter assembly can be used with a plurality of different types of compressor assemblies having different air flow requirements. It is also desirable to provide a universal type filter assembly which likewise includes means to reduce and dampen the overall noise level associated with the operation of the oxygen concentrator, ventilator, or other compressor assembly.

Accordingly, the present invention is directed to a universal type filter assembly which overcomes one or more of the problems as set forth above.

SUMMARY OF INVENTION

The present invention overcomes many of the shortcomings and limitations of the prior art filter assemblies and teaches the construction and operation of several embodiments of a universal type filter assembly which is adaptable for use with a wide variety of different compressor assemblies having different air flow requirements associated therewith wherein ambient air is filtered or otherwise purged of contaminants as it flows through the filter assembly prior to entry into the compressor assembly associated with oxygen concentrators, ventilators and other medical applications in the home care medical equipment area. In one aspect of the present invention, the present filter assembly includes a compartmented housing structure having a first inlet opening and an outlet opening. The first inlet opening is positioned in the housing member for allowing ambient air to enter the filter assembly for passage therethrough before becoming compressed for use in an oxygen concentrator or other compressor application. The first inlet opening is positioned in communication with a first region or first chamber in the housing member which is positioned adjacent a conventional filter member such as a solid core type filter, a pleated type filter, a HEPA filter, or other filter element. The first inlet opening is sized and shaped so as to allow sufficient air flow therethrough to support the air flow requirements associated with the smallest compressor assembly to which the present filter assembly will be attached such as a Platinum 5 Liter Model Oxygen Concentrator. Ambient air entering the housing member through the first inlet opening will therefore migrate through the first chamber, through the conventional filter member, and through a noise attenuating member positioned adjacent the conventional filter member into a second region or second chamber associated with the housing member. The noise attenuating member may be a felt pad which serves to both further restrict and filter the ambient air as it flows therethrough and to suppress the noise of the air flow as it passes through the conventional filter member into the second chamber.

The second chamber is located below the first chamber and lies in communication with a third region or third chamber which includes the outlet. A partition member or baffle member is positioned in the vicinity of the outlet and separates the second chamber from the third chamber. The partition member also separates the first chamber from the third chamber in the vicinity of the outlet thereby preventing ambient air from by-passing the filter member and flowing directly from the first chamber to the third chamber. Additional baffle means are provided in the second chamber for substantially segregating and channeling the air flow through the second chamber into a plurality of flow regions all of which communicate with the third chamber. The third chamber is positioned adjacent to and in communication with the segregated air flow regions of the second chamber. The channeling of the air flow through the second chamber improves air flow characteristics and the baffling means enhances noise attenuation as the air flow exits the second chamber and enters the third chamber en route to the outlet opening. The baffle means serve both as a noise attenuating means for reducing the noise level of the air flowing through the second chamber as well as means for supporting the noise attenuating member and conventional filter member positioned between the first and second chambers.

The housing member likewise includes a second inlet opening positioned in communication with the first chamber for allowing additional ambient air to enter the filter assembly for passage therethrough. The size of the second inlet opening is controlled by an adjustably rotatable dial member or other adjustment member which overlaps the second opening and is positionable to a first position wherein the dial member completely overlaps and seals the second opening, a second position wherein the dial member does not overlap the second opening and the second opening is unobstructed, and any plurality of positions therebetween wherein the dial member only partially covers the second opening. When the second opening is at least partially open, additional ambient air is allowed to enter the filter assembly and supplement the ambient air entering the first inlet opening thereby controlling the amount of air passing through the filter assembly based upon the air flow requirements of the specific compressor assembly to which the present filter assembly is attached. For compressor assemblies having large air flow requirements, the second opening may be fully opened or substantially open to increase air flow through the present filter assembly, and for smaller compressor assemblies, the second opening may be fully closed or substantially fully closed to reduce the air flow through the present filter assembly. As a result, based upon the size of the compressor assembly and the air flow requirements of the particular oxygen concentrator, ventilator, or other breathing apparatus, a user can adjustably, variably control the air flow through the present filter assembly so as to match the air flow needs of the particular compressor assembly to which it is attached.

In addition, movement of the dial or adjustment member may be coordinated with a graduated scale associated with the housing member and may include an indicator member which can be positioned to a particular dial setting corresponding to the air flow requirements associated with a particular compressor assembly or with a particular breathing apparatus such as a Platinum 5 Liter Model Oxygen Concentrator, a Platinum 10 Liter Model Oxygen Concentrator, a Non-Platinum Model Oxygen Concentrator, or any other model oxygen concentrator, ventilator, or other breathing apparatus. Any number of graduated settings between a fully closed second inlet opening and a fully open second inlet opening can be incorporated into the present adjustably movable dial member. In this regard, the size and shape of the second inlet opening will be compatible with the size and shape of the dial member and with the various air flow requirements necessary for operationally providing sufficient air flow to the various compressor assemblies to which the present filter assembly will be attached. Once the appropriate amount of ambient air based upon the air flow requirements of the compressor enter the first chamber, air migrates through the present filter assembly in a manner as previously described, that is, ambient air passes through the conventional filter member and through the noise attenuating member into the second chamber wherein it is segregated into a plurality of flow channels for passage into the third chamber and through the outlet opening for entry into the compressor assembly associated with a particular oxygen concentrator or other breathing apparatus. It is recognized and anticipated that the rotatable dial member may be replaced with any mechanism which will allow the second inlet opening to be progressively uncovered including a linearly moveable slide mechanism.

In addition, since the air flow rate through the compressor assembly likewise determines the level of noise of the compressor during operation, the adjustably rotatable dial member can likewise be used to control the noise level produced by the compressor assembly by controlling the air flow rate therethrough. In certain circumstances, the flow rate can be decreased to enhance noise attenuation while still providing sufficient air flow capacity to the compressor assembly to achieve its operational parameters.

In an alternative embodiment, the first inlet opening may be eliminated and all of the incoming ambient air may be provided to the present filter assembly through the adjustable second inlet opening. In addition, the third chamber may be eliminated and the outlet opening may be associated with the second chamber. Still further, the present filter assembly may include any plurality of chambers, filter members and noise attenuating members without departing from the spirit and scope of the present invention.

As a result, the present filter assembly serves as a universal type assembly for use in conjunction with any number of different types of compressor assemblies based upon different air flow requirements. Such a construction also enables users to stock just one filter assembly instead of a plurality of different types of filter assemblies for servicing a plurality of different types of oxygen concentrators, ventilators, and other breathing apparatus having compressor assemblies with different air flow requirements. This eliminates the need for stocking a wide variety of different types of filter assemblies; it reduces inventory; and it saves time and money. In addition, the present universal type filter assembly is versatile; it is easily attachable to a wide variety of different types of compressor assemblies; it allows a user to adjustably control the air flow requirements through the filter assembly so as to be compatible with the air flow requirements of the particular compressor assembly to which it is attached; it enables a user to adjust the noise level of the compressor assembly based upon adjusting the air flow through the filter assembly; and it provides a baffling mechanism which likewise reduces and dampens the overall noise level of the air flow as it circulates through the second chamber.

BRIEF DESCRIPTION OF DRAWINGS

For a better understanding of the present invention, reference may be made to the accompanying drawings.

DETAILED DESCRIPTION

Figure 1:
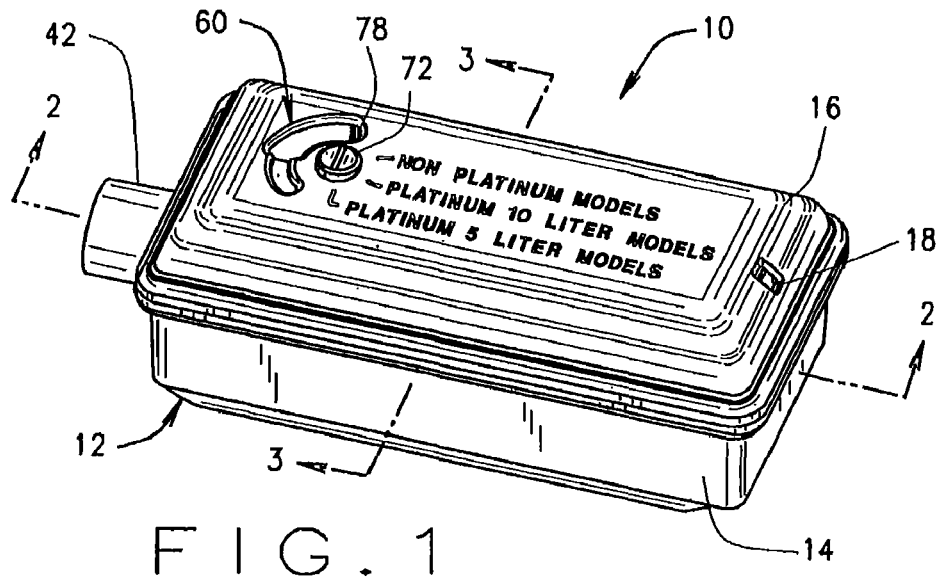
FIG. 1 is a perspective view of one embodiment of the present filter assembly constructed in accordance with the teachings of the present invention.

Referring to the drawings more particularly by reference numbers wherein like numerals refer to like parts, the numeral 10 in FIGS. 1-5 identifies one embodiment of a filter assembly constructed according to the teachings of the present invention. The filter assembly 10 can be constructed so as to be compatible for attachment to any suitable type of compressor fitting associated with any compressor assembly wherein the present filter assembly may be utilized. Although the specific compressor application discussed herein is directed to an oxygen concentrator used in medical applications, it is recognized and anticipated that the present filter assembly can be utilized with any compressor assembly where ambient air or any other air source needs to be filtered during the compression process or other application such as use in association with ventilators and other breathing systems used in the medical equipment industry. It is also recognized that the filter assembly constructed according to the teachings of the present invention can likewise be fashioned into a variety of different sizes and shapes other than those illustrated herein and that the other components associated with the present assemblies may likewise be correspondingly shaped to conform to the shape of the overall assembly and other associated components without departing from the teachings and practice of the present invention.

Figure 2:
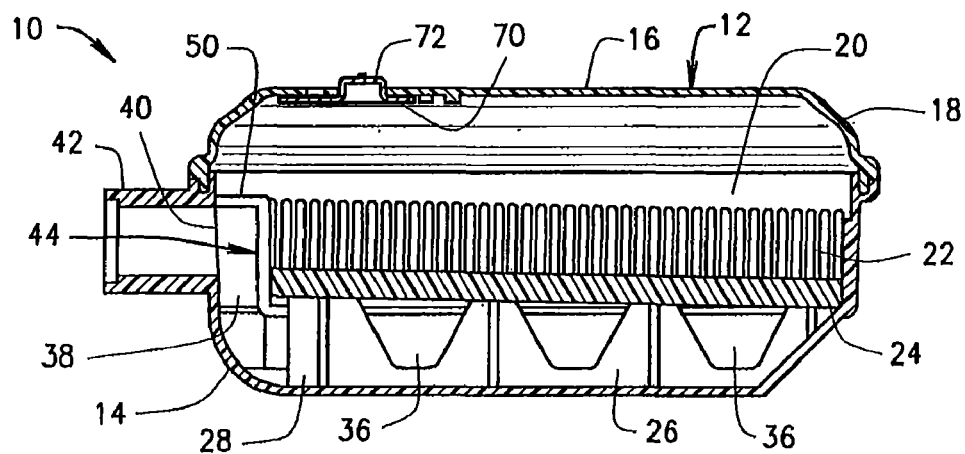
FIG. 2 is a cross-sectional view of the filter assembly of FIG. 1 taken along line 2-2 of FIG. 1.
Figure 3:
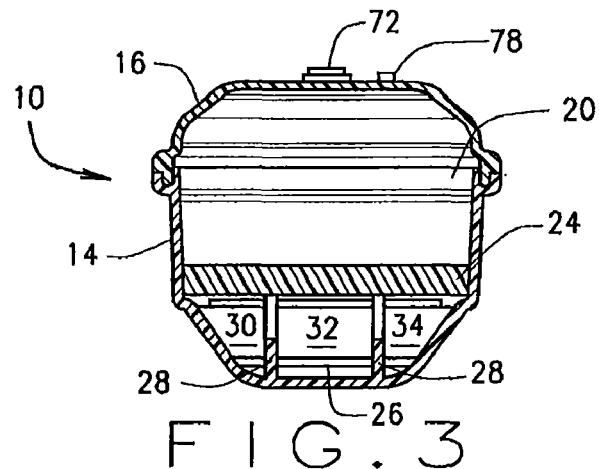
FIG. 3 is a cross-sectional view of the filter assembly of FIG. 1 taken along line 3-3 of FIG. 1.
Figure 4:
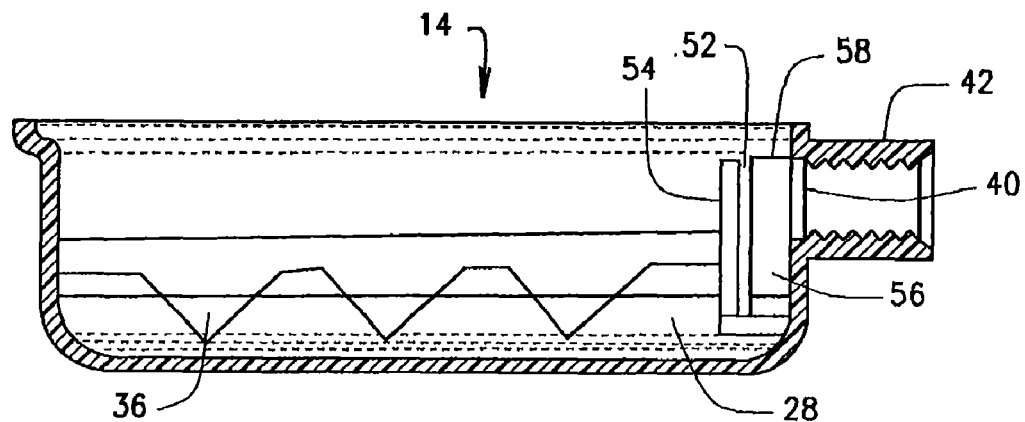
FIG. 4 is a cross-sectional view of the lower housing portion of the filter assembly of FIG. 1.
Figure 5A:
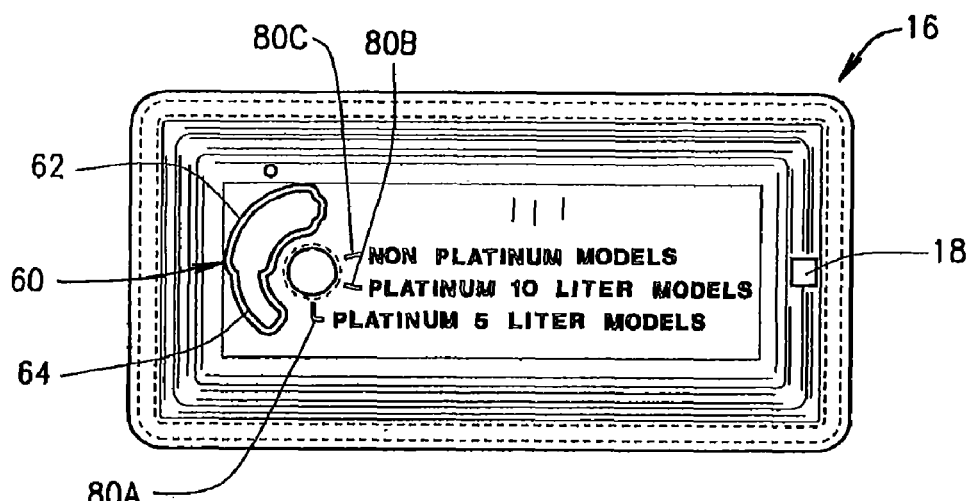
FIG. 5A is a top plan view of the exterior portion of the upper housing portion of the filter assembly of FIG. 1.
Figure 5B:
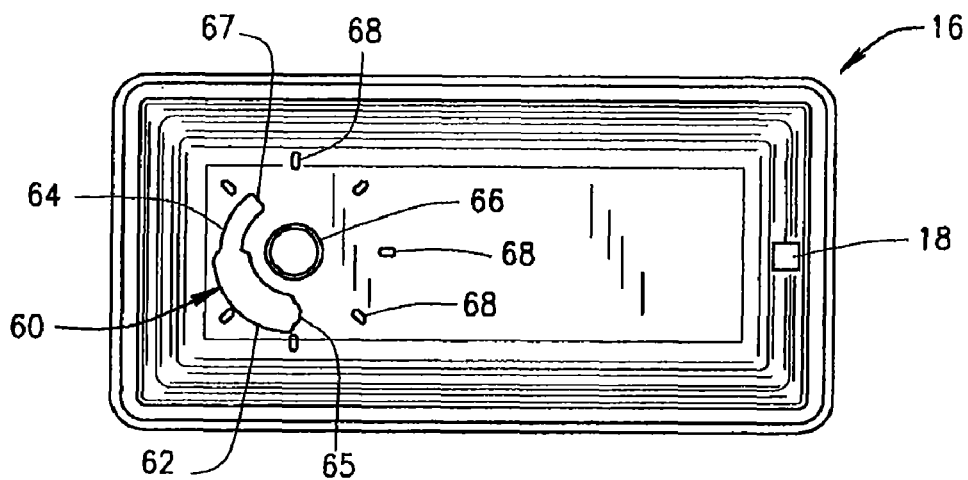
FIG. 5B is a top plan view of the interior portion of the upper housing portion of the filter assembly of FIG. 1.

The filter assembly illustrated in FIGS. 1-5 includes a generally hollow rectangularly shaped housing member 12 which, for ease of manufacturing, includes two separate housing portions, namely, a lower housing portion 14 illustrated in FIG. 4 and an upper housing portion 16 illustrated in FIGS. 5A and 5B. Housing portions 14 and 16 are bonded or otherwise securely attached to each other to form an airtight seal using any suitable means. It has been found that an ultrasonic weld joint accomplishes this task, although other attachment or bonding means can likewise be utilized so long as an airtight seal is formed.

As best shown in FIGS. 2, 3, 5A and 5B, the upper housing portion 16 includes a first inlet opening 18 for allowing ambient air to enter the filter assembly for passage therethrough. The inlet opening 18 is positioned and located in communication with a first region or first chamber 20 which is located adjacent to and above a conventional filter member 22 and a noise attenuating member 24 which is positioned under the filter member 22. The filter member 22 can be a solid core type filter, a pleated type filter, a HEPA filter, or other appropriate filter depending upon the particular application involved. The noise attenuating member 24 is preferably a felt type member such as a felt pad which restricts air flow therethrough for noise attenuation, although any noise attenuating means such as a foam type member and the like may likewise be utilized. The inlet opening 18 is positioned in communication with the first chamber 20 such that ambient air entering the housing member 12 through opening 18 will migrate through the first chamber 20 and through the filter member 22 and noise attenuating member 24 into a second region or second chamber 26 located adjacent to and on the opposite side of members 22 and 24. As will be hereinafter further explained, inlet opening 18 is sized so as to allow the minimum/proper amount of air to enter the filter assembly 10 for meeting the air flow requirements of the smallest compressor assembly to which the filter assembly 10 will be attached. As will be likewise hereinafter further explained, the amount of air allowed to enter the first chamber 20 is adjustably controllable based upon the specific needs and requirements of the compressor assembly to which it will be attached and, as a result, the present filter assembly 10 can be utilized with different compressor assemblies having different air flow requirements. This ability to variably adjustably control the amount of inlet air entering the filter assembly 10 is achieved through the use of a second inlet opening 60 and an adjustably rotatable dial member 70 as will be hereinafter further explained.

As ambient air circulates through the first chamber 20, it will pass through both the filter member 22 and the noise attenuating member 24 before entering the second chamber 26. Air passing through filter member 22 will be purged of any contaminants. In addition, the noise attenuating member 24 likewise serves as a filtering medium as well as a noise attenuation means for reducing the noise level of the air entering the second chamber 26. In this regard, the member 24 absorbs much of the sound generated by the air flowing through the first chamber 20 and through the filter member 22 before it enters the second chamber 26.

The second chamber 26 lies adjacent to chamber 20 on the opposite side of filter member 22 and noise attenuating member 24 and receives the filtered air as it exits chamber 20. The second chamber 26 lies in communication with a third region or third chamber 38 and includes a pair of spaced apart baffle members or plates 28 which extend substantially along the entire length of the second chamber 26. The baffle members 28 segregate and channel the air passing through the members 22 and 24 into three separate regions 30, 32, and 34 as best illustrated in FIG. 3. This segregation and channeling of the air flow from the second chamber 26 into the third chamber 38 improves the overall flow characteristics of the filter assembly 10 and provides better air flow to the third chamber 38. The upper edge portion of each of the baffle members 28 likewise serves as the supporting structure for holding the noise attenuation member 24 and filter member 22 in proper position between chambers 20 and 26. In this regard, the baffle members 28 are positioned and located within the lower housing portion 14 so as to sufficiently hold and support the members 22 and 24 in proper position and the members 28 can be either integrally formed with the lower housing portion 14 or otherwise fixedly attached thereto.

As best illustrated in FIGS. 2 and 4, the baffle members 28 are preferably notched as best shown at 36 so as to allow some air flowing within the segregated regions 30, 32 and 34 of chamber 26 to pass from one region to another. This notched arrangement not only further improves air flow through chamber 26, but it likewise optimizes noise attenuation by letting some air pass into other regions of chamber 26 thereby minimizing any reflections and reverberations of sound waves within the second chamber 26. Although the notched areas 36 of baffle members 28 are illustrated as being substantially triangular in shape, it is recognized and anticipated that the notches 36 can take on a wide variety of different sizes and shapes depending upon the size of the second chamber 26 and the particular applications involved. In this regard, each baffle member 28 can be formed as a one-piece construction, or each member 28 can be comprised of any plurality of segmented portions including a plurality of spaced-apart segmented portions where the space between each segmented portion functions similar to the notched areas 36 to allow air to pass from one of the segmented regions 30, 32 or 34 to another. In addition, it is also recognized and anticipated that the baffle members 28 can be substantially solid in overall configuration with no notched areas or passageways communicating one region with another and still provide sufficient noise attenuation since the members 28 tend to absorb sound and still minimize any reflections and reverberations of sound waves within the second chamber 26. The baffle members 28 also restrict air flow through the second chamber 26 likewise resulting in noise attenuation.

The third chamber 38 lies in communication with the second chamber 26 and includes an outlet opening 40 which provides an exit passageway for allowing the filtered air which has circulated through the filter assembly 10 to exit the assembly for passage into the compressor assembly. Outlet opening 40 communicates with a tubular extension 42 as best illustrated in FIGS. 1, 2 and 4 which likewise includes an opening extending therethrough which communicates with the outlet opening 40. The tubular extension 42 is adaptable for engaging a corresponding compressor fitting to which the present filter assembly 10 would be attached. It is recognized and anticipated that the tubular extension 42 could be modified to adapt for connection to any suitable type of compressor fitting depending upon the particular application involved. This means that the tubular portion 42 could be either internally or externally threaded based upon the particular compressor fitting, or a rubber hose or other fitting member could be slidably engaged over the exterior portion of the tubular extension 42. In the particular embodiment illustrated in FIGS. 2 and 4, the tubular extension 42 is internally threaded.

A second baffle plate or partition member 44 is positioned and located so as to segregate the first chamber 20 from the third chamber 38 and to partially segregate the second chamber 26 from the third chamber 38 as best illustrated in FIGS. 2 and 4. In this regard, the partition member 44 includes wall portion 46 which is positioned and located in spaced apart relationship from the outlet opening 40 thereby defining the third chamber 38 as well as segregating a portion of the third chamber 38 from the second chamber 26. Importantly, wall portion 46 does not extend all the way to the bottom of chamber 26 as best illustrated in FIGS. 2 and 4 thereby allowing air from chamber 26 to flow under wall portion 46 into the third chamber 38. In this regard, the bottom end portion of wall portion 46 may include a flange or projection 48 which extends substantially along the entire bottom edge portion of wall portion 46 for abutting the terminal end portion of baffle members 28. Wall portion 46 also abuts one end portion of both the filter member 22 and the noise attenuating member 24 thereby defining the space between wall portion 46 and one end portion of the lower housing portion 14 for receiving the members 22 and 24.

Figure 6:
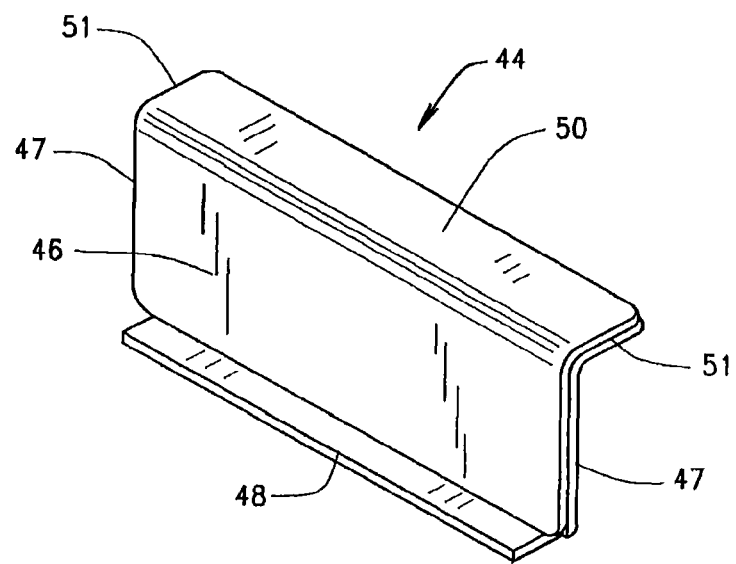
FIG. 6 is a perspective view of the partition member which is positioned and located between the second and third chambers of the filter assembly of FIG. 1.

Partition member 44 likewise includes an upper wall or flange portion 50 as best illustrated in FIGS. 2 and 6 for segregating the first chamber 20 from the third chamber 38. The flange portion 50 is positioned and located so as to extend adjacent to or above the upper periphery of the outlet opening 40 thereby preventing any filtered air entering the third chamber 38 from escaping back into the first chamber 20. In similar fashion, the flange or wall portion 50 likewise prevents unfiltered air circulating within the first chamber 20 from bypassing the filter member 22 and noise attenuating member 24 and passing directly into the third chamber 38. Partition member 44 thereby fully defines the third chamber 38; it completely segregates the first chamber 20 from the third chamber 38; and it provides communication between the second chamber 26 and the third chamber 38. Although it is preferred that the partition member 44 be a one-piece member, it is recognized and anticipated that the member 44 can comprise several components which can either be cooperatively engaged with each other, or which can be merely positioned in abutting relationship with each other. Importantly, however the partition member 44 is fabricated, it is important that mating portions be substantially airtight so that air flow integrity is maintained and that unfiltered air cannot pass from the first chamber 20 directly into the third chamber 38 and that filtered air cannot pass from the third chamber 38 back into the first chamber 20.

The lower housing member 14 may include a pair of spaced apart channels associated with the opposed side wall portions thereof such as channel 52 illustrated in FIG. 4 adaptable for slidably receiving the opposed side edge portions 47 of wall portion 46 as best illustrated in FIG. 4, each channel 52 being formed by a pair of projecting members 54 and 56. The length of projecting member 56 is substantially equal to the length of flange portion 50 associated with the member 44. The upper edge portion 58 of projecting member 56 provides a ledge for mating with the opposed side edge portions 51 of flange portion 50 to mate with and rest thereupon when the side edge portions 47 of wall portion 46 are slidably received within the channels 52. The ledge surfaces 58 should be of sufficient depth to allow the partition member 44 to be supported and held in proper position relative to chambers 20, 26 and 38. In this regard, the projecting member 54 can be much smaller in length, width and depth as compared to member 56 since it only defines one side of the channel 52 and is not required to support any portion of the member 44. The members 54 and 56 and the corresponding channels 52 are positioned and located so as to properly orient the partition member 44 relative to the outlet opening 40 as previously explained. It is also recognized and anticipated that other means for positioning and locating the partition member 44 within the lower housing portion 14 including integrally forming the member 44 with lower housing portion 14 or otherwise fixedly attaching the member 44 thereto can likewise be used without departing from the spirit and scope of the present invention.

Figure 7:
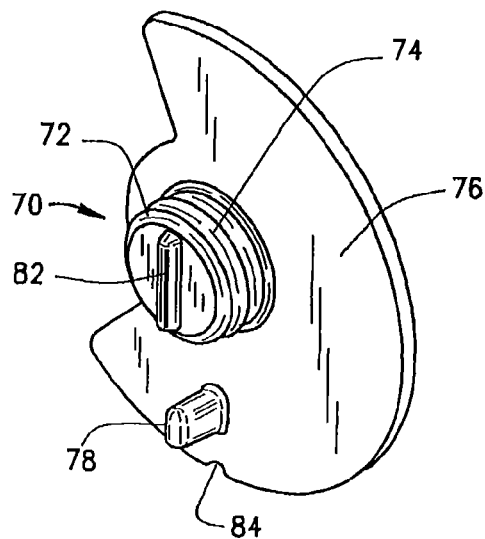
FIG. 7 is a perspective view of the adjustment member positioned in relationship with the adjustable inlet opening associated with the upper housing portion of the filter assembly of FIG. 1.
Figure 8:
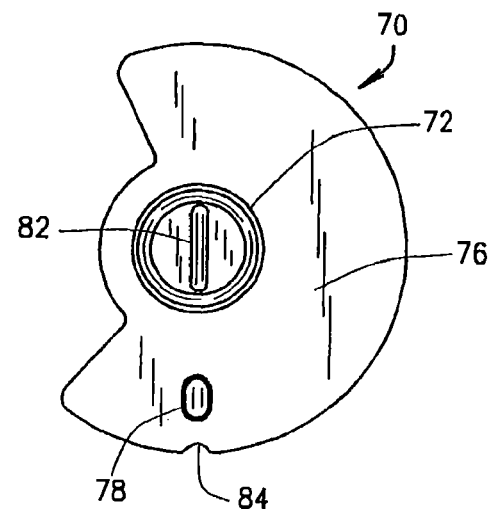
FIG. 8 is a top plan form view of the adjustment member of FIG. 7.

As best illustrated in FIGS. 5A, 5B, 7 and 8, the upper housing portion 16 includes a second inlet opening 60 which is somewhat arcuate in shape and which includes a first portion 62 and a narrower portion 64. This second inlet opening 60 is positioned in communication with the first chamber 20 for allowing additional ambient air to enter the filter assembly 10 for passage therethrough. The size of the second opening 60 is controlled by an adjustably rotatable dial member or adjustment member 70 as best illustrated in FIGS. 7 and 8 which is cooperatively engaged with the upper housing portion 16 as will be hereinafter explained in overlapping relationship with the opening 60, the rotatable dial member 70 being rotatably positionable relative to the second opening 60 so as to either completely overlap and close the second opening 60, or to expose any portion of the opening 60 for allowing ambient air to enter therethrough. In this regard, the rotatable member 70 includes a projection member 72 adaptable for being cooperatively received within the opening 66 associated with the upper housing portion 16. The projection member 72 is grooved or otherwise tapered such as at 74, or it may include an overhang feature, which will allow the projection member 72 to snap into place with the opening 66 so as to form a tight friction fit therebetween while still allowing the projection member 72 to be rotatable such that the main body portion 76 can be rotated relative to the opening 60. When the dial member 70 is engaged with the upper housing member 16, the projection member 72 extends through the opening 66 and is accessible by a user from the top exterior portion of the filter assembly 10. In addition, the main body portion 76 of the member 70 will mate with and lie flush with the underside or inside portion of the upper housing portion 16 as best illustrated in FIG. 2. In this regard, the surface of the body portion 76 may have a conical shape so as to allow for a tight fit with the underside portion of the housing portion 16.

Dial member 70 may also include another projection 78 which is positioned and located on the main body portion 76 so as to be receivable within the second inlet opening 60 when the member 70 is cooperatively engaged with housing portion 16. Projection member 78 functions as a second means for moving the dial member 70 so as to open and/or close any portion of the opening 60. Narrower opening portion 64 receives the projection member 78 when the opening 60 is substantially open. When the projection member 78 is positioned in abutting relationship with end portion 65 of opening portion 62, the second inlet opening 60 is fully covered by the main body portion 76 of dial member 70 and no additional ambient air is allowed to enter the filter assembly 10. This means that only ambient air entering the first inlet opening 18 will be allowed to circulate through the filter assembly 10. As the projection member 78 is moved within the opening slot 62 away from end portion 65, portions of the opening 60 will become uncovered allowing additional ambient air to enter the filter assembly 10. As the member 78 is moved within the opening portion 64, a substantial portion of the second inlet opening 60 will be open and uncovered, the opening 60 being fully open when the projection member is positioned in abutting relationship with end portion 67 of opening portion 64. In this regard, opening portion 64 is positioned and located to receive projection member 78 as it approaches end portion 67. The width of opening portion 64 is preferably slightly wider than the width of member 78 so that the opening portion 64 can function both as a guide means and a partial stop means for preventing accidental movement of the member 78 once it is within opening portion 64. It is also recognized that the opening portion 64 could be identical to opening portion 62 or such portions could take on other shapes and configurations. Opening of the second inlet opening 60 can likewise be accomplished by rotating the projection member 72. Rotation of the member 72 or sliding movement of the member 78 will accomplish opening of the second inlet opening 60.

The main body portion 76 of the dial member 70 is constructed as illustrated in FIGS. 7 and 8 such that movement of either member 72 or 78 will accomplish opening and closing of the second inlet opening 60. Movement of either member 72 or 78 will likewise cause corresponding movement of the other member. As a result, the adjustably rotatable dial member 70 is rotatably positionable between a first position wherein the dial member 70 completely overlaps and seals the second opening 60 and a second position wherein the dial member 70 does not overlap the second opening 60 and such opening is completely unobstructed. It is also recognized that the dial member 70 can be rotatably positioned to any position intermediate the first and second positions such that any plurality of positions between a fully closed position and a fully opened position can be achieved wherein the dial member 70 only partially covers the second inlet opening 60.

When the second inlet opening 60 is at least partially opened, additional ambient air is allowed to enter the filter assembly 10 and supplement the ambient air already entering the first inlet opening 18 thereby controlling the amount of air passing through the filter assembly 10 based upon specific air flow requirements associated with a specific compressor assembly. For example, for compressor assemblies having a large air flow requirement, the second opening 60 may be fully opened or substantially fully opened to increase air flow through the filter assembly 10. In contrast, for smaller compressor assemblies, since the air flow requirements are less, the second opening 60 may be fully closed or substantially fully closed to reduce the air flow through the filter assembly 10. As a result, based upon the size of the compressor assembly and the air flow requirements of the particular oxygen concentrator, ventilator, or other breathing apparatus to which the present filter assembly 10 will be attached, a user can adjustably, variably control the air flow through the filter assembly 10 so as to match the air flow needs of the particular compressor assembly.

Rotational movement of the dial member 70 may likewise be coordinated with a graduated scale or other marking system associated with the upper housing portion 16 as illustrated at 80 and wherein the projection member 72 may include an indicator 82 which can be rotatably positioned to any one of the particular dial settings 80 corresponding to the air flow requirements associated with a particular compressor assembly, or a particular oxygen concentrator, ventilator, or other breathing apparatus. In the embodiment illustrated in FIG. 5A, the dial settings 80 correspond to the air flow requirements associated with a Platinum 5 Liter Model Oxygen Concentrator, a Platinum 10 Liter Model Oxygen Concentrator, and a non-Platinum Model Oxygen Concentrator. The dial setting markings 80A, 80B, and 80C correspond to the positioning of the indicator 82 for achieving the particular air flow requirements associated with the particular oxygen concentrators designated on the top portion of the upper housing portion 16. Movement of the dial member 70 relative to the indicator 82 and the corresponding dial settings 80A, 80B and 80C can be calibrated so that the required air flow characteristics are produced when the indicator 82 is aligned with any one of the appropriate dial settings 80.

The inside portion of the upper housing portion 60 may likewise include a plurality of locator tabs 68 as illustrated in FIG. 5B for mating with a corresponding locator notch or indentation 84 associated with the outer periphery of the main body portion 76 of dial member 70 as best illustrated in FIG. 8. The locator tabs 68 are positioned and located such that when the indicator 82 is aligned with any one of the dial settings 80A, 80B and 80C, the locator indentation 84 is aligned and positioned adjacent to the appropriate locator tab 68. As the dial member 70 is rotated, and when the locator indentation 84 mates with one of the locator tabs 68, the dial member 70 will snap or lock into position with the corresponding tab 68 thereby acting as a partial stop mechanism at each of the respective dial settings 80. Engagement of the locator indentation 84 with a respective tab 68 is easily overcome by again rotating projection member 72 or slidably moving projection member 78 to the next appropriate setting. In this regard, it is recognized and anticipated that any number of graduated dial settings 80 between a fully closed second inlet opening 60 and a fully open second inlet opening 60 can be incorporated into the dial member 70 and the upper housing portion 16. In addition, the size and shape of the second opening 60 will be compatible with the size and shape of the dial member 70 and with the various air flow characteristics/requirements necessary for operationally providing sufficient air flow to the various compressor assemblies to which the filter assembly 10 will be attached. Once the appropriate amount of ambient air based upon the air flow requirements of the compressor assembly enter the first chamber 20, air migrates through the filter assembly 10 in the same manner as previously described.

It is also recognized and anticipated that means other than the locator tabs 68 and locator indentation 84 can be utilized to provide a lock type mechanism associated with each of the graduated dial settings 80 and that the overall shape and dimensions of the dial member 70 and the opening 60 can vary depending upon the overall shape and configuration of the filter assembly 10. Still further, it is recognized and anticipated that the positioning of the first inlet opening 18 and the variable second inlet opening 60 can vary and can be positioned at different locations in association with the upper housing portion 16 based upon the positioning of the outlet opening 40 as well as other factors. In addition, since the air flow rate through the compressor assembly to which the filter assembly 10 is attached likewise determines the level of noise associated with the compressor operation, the rotatable dial member 70 can likewise be utilized to control the noise level produced by the compressor assembly by controlling the air flow rate to such compressor assembly. In certain circumstances, the flow rate can be decreased to enhance noise attenuation while still providing sufficient air flow capacity to the compressor assembly to achieve its operational parameters. As such, a user can manipulate the dial member 70, within limits, to dampen the noise level of the compressor assembly, if necessary. In this regard, additional locator tabs can be positioned between the dial settings 80 associated with a particular oxygen concentrator model or a particular compressor assembly to frictionally hold the dial member 70 at a multitude of different positions between the compressor assembly settings. Other variations are likewise anticipated. Also, although the second inlet opening 60 is illustrated as being substantially arcuate in shape, it is recognized and anticipated that the opening 60 can be elongated, rectangular, or take on any shape based upon the size and shape of the upper housing portion 16, and it is recognized that the adjustment dial member 70 can move in a substantially linear direction as compared to being rotatable as illustrated and described herein.

The noise attenuating member 24 serves primarily as sound/acoustic dampening material to minimize the noise emissions from the oxygen concentrator or other compressor assembly. Sound waves tend to reflect and reverberate off of various surfaces associated with the housing portions 14 and 16. The member 24 tends to absorb the sound and minimize such reflections and reverberations of the sound waves within the housing member 12. In addition, the baffling members 28 likewise tend to channel the air flow more directly to the third chamber 38 thereby similarly minimizing any reflections and reverberations of the sound waves within the second chamber 26. The notched areas 36 likewise tend to minimize such reflections and reverberations as they allow such sound waves to expand into another flow channel thereby allowing such sound waves to disburse and dissipate as the air flow moves from the second chamber 26 to the third chamber 38. As a result, acoustic dampening occurs within chambers 26 and 38 and any sound associated with the air flow moving therethrough will be dampened and/or absorbed. In this regard, although it is generally preferred that the noise attenuating member 24 be made of a felt type material, it is again recognized and anticipated that other noise attenuating materials with appropriate sound absorptive properties are also available and suitable for use in association with the filter assembly 10. Such materials may include foam type materials and other materials capable of providing the necessary flow characteristics and noise reduction suitable for the intended use of the particular filter assembly 10.

In an alternative embodiment, it is recognized and anticipated that the present filter assembly can be constructed with a housing member having only two chambers instead of three. In this embodiment (not shown), the housing member would be substantially similar in construction and operation to the housing member 12 described above but differing therefrom in that the third chamber 38 would be eliminated from the overall filter assembly. In this particular embodiment, the second chamber such as the chamber 26 would include the outlet opening 40. In other words, the outlet opening 40 would lie in communication with the second chamber and air flowing through the second chamber will flow through the corresponding outlet opening for passage into the compressor assembly. Obviously, in this particular embodiment, the partition member 44 is not needed and the filter member and noise attenuating member can extend substantially along the full length of the housing member. In all other respects, the construction of the housing member associated with this alternative embodiment is substantially similar to the structure of the housing member 12 discussed above including the construction of the upper housing portion 16, the baffle members 28, the inlet opening 60, and the adjustment member 70. As previously described, in this particular embodiment, ambient air would enter the first chamber, pass through the filter member and noise attenuating member into the second chamber, and then exit through the outlet opening into the compressor assembly.

Still further, it is also recognized and anticipated that the housing member 12 could be constructed with any plurality of chambers and with any number of filter members and noise attenuating members without departing from the spirit and scope of the present invention.

In still another embodiment of the present filter assembly, it is recognized and anticipated that the first inlet opening 18 could be eliminated and that all ambient air entering the present filter assembly could be controlled solely through adjustment of the inlet opening 60. In this particular embodiment, adjustment of the dial member 70 or other equivalent adjustment member as described above would be utilized to vary the size of the inlet opening 60 so as to be compatible with the particular air flow requirements associated with the compressor assembly or oxygen concentrator, ventilator, or other breathing apparatus to which the present filter assembly would be attached. It is also recognized and anticipated that this particular embodiment could include two chambers, three chambers, or any plurality of chambers as discussed above.

It is also recognized and anticipated that the variable inlet opening 60 and its associated adjustment member 70 can take on a wide variety of different shapes and configurations and it is recognized that the adjustment member 70 can be moved relative to the opening 60 in a wide variety of different orientations including in a substantially linear direction such as a linearly movable slide mechanism as compared to the rotatable movement of adjustment member 70 illustrated and described herein. It is also recognized that the adjustment member 70 can be moved in other non-linear directions relative to the inlet opening 60.

It is also anticipated that the filter housing portions 14 and 16 as well as members 44 and 70 can be made using an injection molded plastic resin, although other materials may likewise be utilized. Still further, it is also recognized that the overall dimensions of the present filter assembly as well as the specific shape and configuration of the various members associated therewith are also subject to wide variations and may be sized and shaped into a wide variety of different sizes and configurations so as to be compatible with the size and shape of the particular compressor assemblies to which the present filter assembly 10 may be mounted, or to conform with any space limitations associated therewith without impairing the teachings and practice of the present invention. Although the filter assembly 10 is illustrated as being substantially rectangular, it can take on other shapes such as square, triangular and so forth. Other variations and modifications to the various components comprising the present assembly is also contemplated.

Thus, there has been shown and described several embodiments of a novel filter assembly which is adaptable for installation onto the inlet of a plurality of different compressor assemblies having different air flow characteristics associated therewith, which filter assembly fulfills all of the objects and advantages sought therefore. Many changes, modifications, variations and other uses and applications of the present invention will, however, become apparent to those skilled in the art after considering this specification and the accompanying drawings. All such drawings, modifications, variations and other uses and applications which do not depart from the spirit and scope of the present invention are deemed to be covered by the present invention which is limited by the claims which follow.

What is claimed is:

1. A filter assembly for use with a compressor assembly comprising:
   a housing member having at least one inlet opening and an outlet opening;
   a first chamber positioned and located within said housing member in communication with said at least one inlet opening for receiving ambient air therewithin;
   a filter member positioned and located within said housing member for receiving ambient air from said first chamber;
   a second chamber positioned and located within said housing member for receiving ambient air after it passes through said filter member; and
   an adjustment member having at least a portion thereof positioned and located for access external to said housing member for selectively varying the size of said at least one inlet opening for adjustably controlling the amount of ambient air entering said first chamber;
   said outlet opening being positioned and located such that ambient air passing through said second chamber will migrate to said outlet opening.

2. The filter assembly defined in claim 1 wherein said adjustment member is adjustably positionable to a plurality of different positions between a first position wherein said at least one inlet opening is substantially closed and a second position wherein said at least one inlet opening is substantially open.

3. The filter assembly defined in claim 2 wherein said adjustment member is rotatably positionable relative to said at least one inlet opening.

4. The filter assembly defined in claim 2 including a plurality of indicator markings associated with said housing member positioned between the first and second positions of said adjustment member for identifying various different positions therebetween for adjustably controlling the amount of ambient air entering said first chamber.

5. The filter assembly defined in claim 1 including a noise attenuation member positioned adjacent said filter member.

6. The filter assembly defined in claim 1 including at least a pair of partition members disposed within said second chamber for segregating and channeling the air passing through said second chamber into a plurality of separate regions.

7. The filter assembly defined in claim 6 wherein said partition members include notched areas for allowing air to flow from one segregated region to another.

8. The filter assembly defined in claim 6 wherein said partition members support said filter member and its position within said housing member.

9. The filter assembly defined in claim 6 wherein said partition members function as sound dampening means to absorb and minimize sound generation within said second chamber.

10. The filter assembly defined in claim 1 including a third chamber positioned and located in said housing member in communication with said second chamber such that ambient air passing through said second chamber will enter said third chamber.

11. The filter assembly defined in claim 10 wherein said outlet opening is positioned and located in communication with said third chamber.

12. The filter assembly defined in claim 5 wherein said noise attenuating member is made of felt material.

13. The filter assembly defined in claim 1 wherein said housing member includes a lower housing portion and an upper housing portion.

14. The filter assembly defined in claim 1 wherein said filter member is a HEPA filter.

15. The filter assembly defined in claim 1 including a second inlet opening, said second inlet opening being non-variable in size.

16. A filter assembly for use in controlling the amount of air entering an oxygen concentrator or other breathing system comprising:
   a housing member having at least one inlet opening and an outlet opening;
   a first chamber positioned and located within housing member in communication with said at least one inlet opening for receiving ambient air therewithin;
   a second chamber positioned and located within said housing member for receiving air from said first chamber;
   a filter member positioned and located between said first and second chambers such that ambient air passing from said first chamber through said filter member will enter said second chamber;
   a third chamber positioned and located within said housing member in communication with said second chamber such that ambient air passing through said second chamber will enter said third chamber, said third chamber including said outlet opening; and an adjustment member positioned in relationship to said at least one inlet opening and having at least a portion thereof located for access external to said housing member for selectively varying the size of said at least one inlet opening for controlling the amount of ambient air entering said first chamber.

17. The filter assembly defined in claim 16 wherein said adjustment member overlaps said at least one inlet opening and is positionable to a plurality of different positions between a fully closed position wherein said at least one inlet opening is completely covered and no ambient air is allowed to enter said first chamber and a fully open position wherein said at least one inlet opening is completely uncovered for allowing ambient air to enter said first chamber.

18. The filter assembly defined in claim 16 including a plurality of indicator markings associated with said housing member positioned between the first and second positions of said adjustment member for identifying various different positions between said first and second positions for adjustably controlling the amount of ambient air entering said first chamber.

19. The filter assembly defined in claim 18 wherein said housing member includes a plurality of locator tabs, at least some of said locator tabs being positioned and located so as to correspond with at least some of the indicator markings associated with said housing member, and said adjustment member including a corresponding locator indentation, said locator indentation being adaptable to mate with said locator tabs as said adjustment member is adjustably positioned between its fully closed position and its fully open position.

20. The filter assembly defined in claim 18 wherein said adjustment member includes an indicator for aligning with any one of the indicator markings associated with said housing member when said adjustment member is positionable to any one of said plurality of indicator markings.

21. The filter assembly defined in claim 16 wherein said second chamber includes at least one baffle member for segregating and channeling air flow through said second chamber.

22. The filter assembly defined in claim 16 including a noise attenuation member positioned and located between said filter member and said second chamber.

23. A filter assembly for use with a compressor assembly comprising:
a housing member having a first inlet opening and an outlet opening;
a first chamber positioned and located within said housing member in communication with said first inlet opening for receiving ambient air therewithin;
a second chamber positioned and located within said housing member for receiving ambient air from said first chamber;
a filter member positioned and located between said first and second chambers such that ambient air exiting said first chamber will pass through said filter member and enter said second chamber;
a third chamber positioned and located within said housing member in communication with said second chamber such that ambient air passing through said second chamber will enter said third chamber, said third chamber including said outlet opening;
a second inlet opening associated with said housing member positioned and located in communication with said first chamber; and
an adjustment member having at least a portion thereof positioned and located for access external to said housing member for selectively varying the size of said second inlet opening for adjustably controlling the amount of ambient air entering said first chamber through said second inlet opening.

24. The filter assembly defined in claim 23 wherein said adjustment member is positionable between a first position wherein said second inlet opening is fully closed, a second position wherein said second inlet opening is fully open, and any plurality of positions between said first and second positions.

25. The filter assembly defined in claim 24 wherein said adjustment member overlaps said second inlet opening and is rotatably positionable to said first, second and said plurality of positions between said first and second positions.

26. The filter assembly defined in claim 23 including a noise attenuation member positioned and located between said filter member and said second chamber.

27. The filter assembly defined in claim 23 wherein said second chamber includes at least one partition member for segregating and channeling the air flow through said second chamber.

28. The filter assembly defined in claim 27 wherein said at least one partition member includes a notched area for allowing air to flow therethrough.

29. The filter assembly defined in claim 23 including a partition member positioned between said second and third chambers, said partition member partially segregating said third chamber from said second chamber.

30. The filter assembly defined in claim 29 wherein said partition member segregates said third chamber from said first chamber.

31. The filter assembly defined in claim 23 wherein said second inlet opening is arcuate in shape.

32. A filter assembly for use with an oxygen concentrator or other breathing system comprising:
a housing member having first and second inlet openings and an outlet opening;
a first chamber positioned and located within said housing member in communication with said first and second inlet openings for receiving ambient air therewithin;
a filter member disposed adjacent said first chamber for receiving ambient air exiting said first chamber;
a noise attenuation member positioned adjacent said filter member for receiving ambient air passing through said filter member;
a second chamber positioned and located within said housing member adjacent said noise attenuation member for receiving ambient air passing through said noise attenuation member;
at least one baffle member positioned within said second chamber for segregating and channeling the air flow through said second chamber;
a third chamber positioned and located within said housing member in communication with said second chamber such that ambient air passing through said second chamber will enter said third chamber; and
a rotatable dial member overlapping said second inlet opening and having at least a portion thereof positioned and located for access external to said housing member for selectively varying the size of said second inlet opening for adjusting the amount of ambient air entering said first chamber through said second inlet opening;
said rotatable dial member being positionable between a first position wherein said second inlet opening is fully closed, a second position wherein said second inlet opening is fully open, and any plurality of third positions intermediate said first and second positions.

33. The filter assembly defined in claim 32 wherein said housing member includes a plurality of indicator markings positioned and located between the first and second positions of said rotatable dial member, said rotatable dial member being rotatably positionable to a position corresponding to any one of said indicator markings.

34. The filter assembly defined in claim 32 wherein said at least one baffle member supports said noise attenuation member and said filter member.

35. The filter assembly defined in claim 32 wherein said housing member includes a lower housing portion and an upper housing portion.

36. The filter assembly defined in claim 35 wherein said first and second inlet openings are associated with said upper housing portion.

37. The filter assembly defined in claim 33 wherein said housing member includes a plurality of locator tabs, at least some of said locator tabs being positioned and located so as to correspond with at least some of the indicator markings associated with said housing member, and said rotatable dial member including a corresponding locator indentation, said locator indentation being adaptable to mate with said locator tabs as said rotatable dial member is adjustably positioned between its first and second positions.

38. The filter assembly defined in claim 32 wherein said rotatable dial member includes a projection member receivable within said second inlet opening for moving said rotatable dial member between its first and second positions.

39. The filter assembly defined in claim 33 wherein said rotatable dial member includes an indicator for aligning the rotatable dial member at a predetermined location relative to said second inlet opening with any one of the indicator markings associated with said housing member.

* * * * *